(12) United States Patent
Wang

(10) Patent No.: US 11,988,912 B2
(45) Date of Patent: May 21, 2024

(54) INTELLIGENT WINDOW SYSTEM AND IN-VEHICLE SYSTEM

(71) Applicant: BOE TECHNOLOGY GROUP CO., LTD., Beijing (CN)

(72) Inventor: Yongbo Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/044,082

(22) PCT Filed: Dec. 12, 2019

(86) PCT No.: PCT/CN2019/124820
§ 371 (c)(1),
(2) Date: Sep. 30, 2020

(87) PCT Pub. No.: WO2021/114171
PCT Pub. Date: Jun. 17, 2021

(65) Prior Publication Data
US 2023/0152616 A1 May 18, 2023

(51) Int. Cl.
G02F 1/133 (2006.01)
B60J 3/04 (2006.01)
G02F 1/1333 (2006.01)
H02H 7/00 (2006.01)

(52) U.S. Cl.
CPC ............ *G02F 1/13318* (2013.01); *B60J 3/04* (2013.01); *G02F 1/13338* (2013.01); *H02H 7/008* (2013.01); *G02F 2203/48* (2013.01)

(58) Field of Classification Search
CPC .................................................. G02F 1/13318
See application file for complete search history.

(56) References Cited

U.S. PATENT DOCUMENTS

| 10,293,666 | B2 | 5/2019 | Choi et al. |
| 2018/0043756 | A1 | 2/2018 | Kaphengst et al. |
| 2018/0079284 | A1* | 3/2018 | Choi ..................... G02F 1/0121 |

FOREIGN PATENT DOCUMENTS

| CN | 206086298 U | 4/2017 |
| CN | 206327129 U | 7/2017 |
| CN | 108944369 A | 12/2018 |
| CN | 110597323 A | 12/2019 |
| CN | 210680355 U | 6/2020 |
| JP | 2000006656 A | 1/2000 |

OTHER PUBLICATIONS

European Patent Office, EESR dated Oct. 26, 2022, for corresponding EP application 19945462.0.

* cited by examiner

*Primary Examiner* — Joseph P Martinez
(74) *Attorney, Agent, or Firm* — HOUTTEMAN LAW LLC

(57) ABSTRACT

The disclosure provides an intelligent window system and an in-vehicle system, and relates to the technical field of window display. The intelligent window system of the disclosure includes: a plurality of dimming glasses and a central processer. The plurality of dimming glasses are communicatively coupled to the central processor and configured to adjust light transmittance according to a dimming instruction sent by the central processor.

14 Claims, 5 Drawing Sheets

INTELLIGENT WINDOW SYSTEM AND IN-VEHICLE SYSTEM

TECHNICAL FIELD

The disclosure relates to the technical field of window display, and particularly relates to an intelligent window system and an in-vehicle system.

BACKGROUND

A dimming glass is also called an electric control dimming glass, an electric control liquid crystal glass, an intelligent dimming glass and the like, and is a functional sandwich glass product formed by sandwiching a high-tech liquid crystal film between two layers of glass to be processed at a high temperature and a high pressure. For example, according to different control means and principles, the dimming glass can be switched between a transparent state and an opaque state by various modes such as electric control, temperature control, light control, pressure control and the like. Due to the limitation of various conditions, the dimming glass for realizing mass production in the current market is almost a dimming glass of an electric control type. For example, when the dimming glass is powered off, liquid crystal molecules in the dimming glass are in an irregular dispersion state, and the electric control dimming glass presents a light transmissive and opaque appearance; when the dimming glass is powered on, the liquid crystal molecules in the dimming glass are arranged orderly, light can penetrate through the liquid crystal molecules freely, and the dimming glass presents a transparent state instantly.

SUMMARY

The present disclosure aims to solve at least one of the technical problems existing in the prior art, and an intelligent window system and an in-vehicle system are provided.

In a first aspect, an intelligent window system is provided, and includes a plurality of dimming glasses and a central processor; the plurality of dimming glasses are communicatively coupled to the central processor, and configured to adjust light transmittance according to a dimming instruction sent by the central processor.

In some embodiments, the dimming glass includes a glass assembly, a first controller and a brightness sensor; the brightness sensor is configured to sense brightness of external ambient light; and the first controller is configured to adjust the light transmittance of the glass assembly according to the brightness sensed by the brightness sensor.

In some embodiments, the dimming glass further includes a first touch component and a first display component; the first display component includes a plurality of first pixel units and a first driving unit, the first driving unit is configured to drive the first pixel units to display under the control of the first controller; and the first touch component includes a plurality of first touch units, which are configured to send a corresponding first touch control signal to the first controller according to a received touch control instruction, such that the first controller adjusts the light transmittance of the glass assembly according to the first touch control signal.

In some embodiments, the first controller is configured to control the first driving unit to drive the first pixel units to generate a plurality of light emitting points; and the first touch unit is provided corresponding to an area where the light emitting point is located; the first control unit is configured to send different dimming instructions when receiving touch control signals sent by different touch units provided in areas where different light emitting points are located.

In some embodiments, the intelligent window system further includes a display, and the first controller is further configured to send a current light transmittance of the glass assembly to the central processor, such that the central processor controls the display to display the current light transmittance of the glass assembly.

In some embodiments, the display includes a second touch component configured to send a corresponding second touch control signal to the central processor according to the received touch control instruction; and the central processor is configured to send a corresponding dimming instruction to the first controller according to the received second touch control signal, such that the first controller adjusts the light transmittance of the glass assembly according to the dimming instruction.

In some embodiments, the display and the central processor are integrated in a same terminal.

In some embodiments, the first controller and the central processor are coupled to each other by a bus.

In some embodiments, the intelligent window system further includes a power module coupled to the plurality of dimming glasses and the central processor for supplying power to the plurality of dimming glasses and the central processor.

In some embodiments, the dimming glass further includes a waveform data control unit, a digital-to-analog converter, a first resistor, a second resistor, a third resistor, a fourth resistor, a first capacitor and a high-voltage operational amplifier; the waveform data control unit is coupled to the first controller; an input terminal of the digital-to-analog converter is coupled to the first controller, a first output terminal of the digital-to-analog converter is coupled to a reference voltage terminal and a first terminal of the first resistor, and a second output terminal of the digital-to-analog converter is coupled to a first terminal of the fourth resistor; a second terminal of the first resistor is coupled to a first terminal of the second resistor, and a second terminal of the second resistor is coupled to a low power supply voltage terminal; a first terminal of the third resistor is coupled to the second terminal of the first resistor, the first terminal of the second resistor and a reverse input terminal of the high-voltage operational amplifier; a forward input terminal of the high-voltage operational amplifier is coupled to a second terminal of the fourth resistor and a first terminal of the first capacitor; a second terminal of the first capacitor is coupled to the low power supply voltage terminal; and an output terminal of the high-voltage operational amplifier is coupled to the glass assembly; and a power supply terminal of the high-voltage operational amplifier is coupled to the power module.

In some embodiments, the power module includes a power unit for supplying a standard power supply voltage; a power isolator for isolating a voltage higher than the standard power supply voltage; and a board-level power conversion unit for converting the standard power supply voltage into voltages required by the dimming glass and the central processor respectively.

In some embodiments, the power module further includes a transient voltage suppressor and a voltage regulator; the transient voltage suppressor is coupled to the power isolator, the voltage regulator and the low power supply voltage terminal, the voltage regulator is coupled to the board-level power conversion unit and the low power supply voltage terminal; and the transient voltage suppressor and the voltage regulator are configured to regulate a voltage output by the power isolator.

In a second aspect, an in-vehicle system is provided in the embodiments of the disclosure, and includes the intelligent window system above.

DETAILED DESCRIPTION

In order to enable those skilled in the art to better understand the technical solutions of the present disclosure, the present disclosure will be further described in detail below with reference to the drawings and specific embodiments.

Unless otherwise defined, the technical or scientific terms used in the disclosure shall have the general meaning understood by those with general skills in the art to which the disclosure belongs. "First", "second" and similar words used in the present disclosure do not indicate any order, quantity or importance, but are only used to distinguish different components. Similarly, "one", "a" or "the" and the like do not indicate a quantitative limit, but rather the existence of at least one. "Include" or "comprise" and other similar words mean that the elements or objects appearing before the word cover the elements or objects appearing after the word and their equivalents, without excluding other elements or objects. Words like "connect" or "couple" are not limited to physical or mechanical connections, but can include electrical connections, whether direct or indirect. "Up", "down", "left", "right" and so on are only used to represent the relative position relationship, and when an absolute position of the described object changes, the relative position relationship may also change accordingly.

Figure 1:
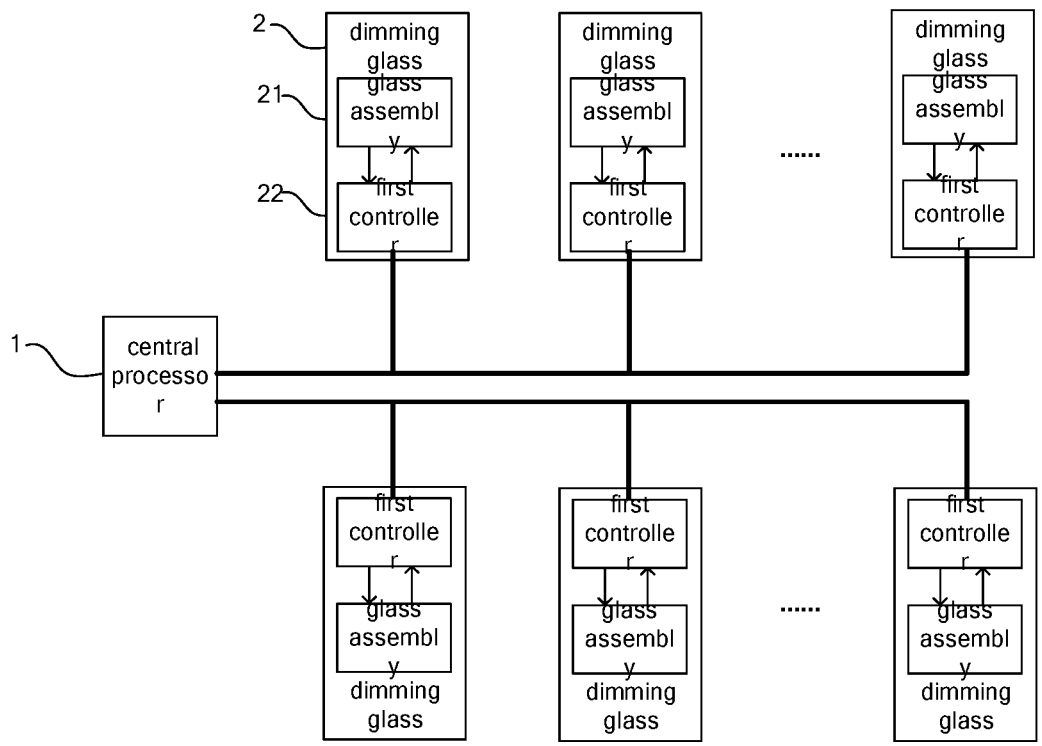
FIG. 1 is a schematic view of an intelligent window system according to an embodiment of the present disclosure.

In a first aspect, an embodiment of the present disclosure provides an intelligent window system, which may be applied to a window system of an automobile, a train, an airplane and the like. FIG. 1 is a schematic view of an intelligent window system according to an embodiment of the present disclosure. Referring to FIG. 1, the intelligent window system includes a plurality of dimming glasses 2 and a central processor 1. The plurality of dimming glasses 2 are communicatively coupled to the central processor. Each dimming glass 2 can adjust its light transmittance according to a dimming instruction sent by the central processor 1.

In the embodiment of the disclosure, the light transmittance of the plurality of dimming glasses 2 is simultaneously controlled through the one central processor 1, such that the light transmittance of the window system of the automobile, the train, the airplane and the like applying the intelligent window system is controlled more intelligently.

The structures of the dimming glass and the central processor are described below.

Figure 2:
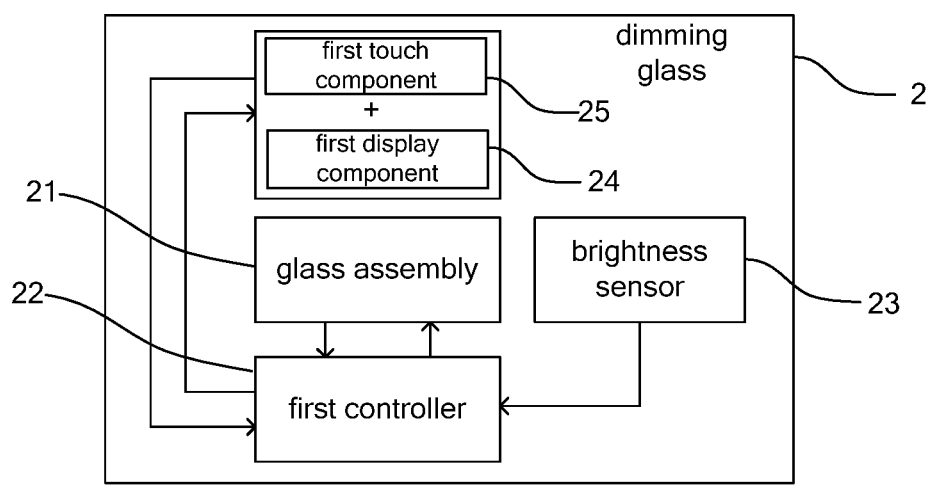
FIG. 2 is a schematic view of a dimming glass according to an embodiment of the present disclosure.

FIG. 2 is a schematic view of a dimming glass according to an embodiment of the present disclosure. Referring to FIG. 2, in some embodiments, the dimming glass includes: a glass assembly 21, a first controller 22 and a brightness sensor 23. The brightness sensor 23 is configured to sense brightness of external ambient light and transmits the sensed brightness value to the first controller 22. The first controller 22 adjusts light transmittance of the glass assembly 21 according to a corresponding relationship between a stored brightness value range and a stored light transmittance.

For example, since the light irradiation angles on the dimming glasses 2 on two sides of the automobile are different, if the brightness sensor 23 on the dimming glass 1 at one side senses a higher brightness of the external ambient light, the light transmittance of the glass assembly 21 is reduced by the first controller 22 of the dimming glass 1 on the one side; correspondingly, if the brightness sensor 23 on the dimming glasses 2 on the other side senses a lower brightness of the external ambient light, the light transmittance of the glass assembly 21 is increased by the first controller 22 of the dimming glasses 2 on the other side, such that the proper brightness adjustment in the vehicle is realized, and the defect due to direct irradiation of the external ambient light is avoided. In some embodiments, besides the above structure, the dimming glass 2 further includes: a first display component 24 and a first touch component 25. The first display component 24 includes: a plurality of first pixel units and a first driving unit. The driving unit is used for driving the first pixel units to display under control of the first controller. The first touch component includes: a plurality of first touch units. The plurality of first touch units are used for sending corresponding first touch control signals to the first controller 22 according to the received touch control instructions, such that the first controller 22 adjusts the light transmittance of the glass assembly 21 according to the first touch control signals.

Specifically, the first touch unit may be a capacitive touch unit, that is, each touch unit includes a driving electrode and a receiving electrode. When there is a touch, a capacitance between the driving electrode and the receiving electrode changes, and the touch control signal is sent from the receiving electrode of the first touch unit to the first controller. A change of the capacitance between the driving electrode and the receiving electrode is analyzed by the first controller based on the touch control signal. After the change of the capacitance is detected, a corresponding dimming instruction is sent to the glass assembly 21, such that the glass assembly 21 adjusts its light transmittance based on the dimming instruction.

In the embodiment of the present disclosure, the first controller 22 and the central processor 1 each may be a control chip such as a Micro Controller Unit (MCU) and a Central Processing Unit (CPU).

Further, in some embodiments, the first controller 22 in the dimming glass 2 is configured to control the driving unit to drive some pixel units for display so as to generate a plurality of light emitting points. The touch unit in the first touch component is provided corresponding to an area where the light emitting point is located. That is, a touch unit is provided at a position where a light emitting point is located. Moreover, in the embodiment of the present disclosure, the touch unit provided at the position where a light emitting point is located sends a touch control signal to the first controller 22 after receiving the touch control instruction. At this time, the first controller 22 generates different dimming instructions according to the touch control signals sent by the touch units at different positions, such that the glass assembly 21 can adjust the light transmittance based on the dimming instructions. In short, a light emitting point is equivalent to a touch dimming button.

Specifically, if the first controller 22 controls the driving unit to drive the corresponding pixel units for display and three light emitting points in total are generated. The three light emitting points may be arranged side by side at intervals. A group of touch units is provided at a position corresponding to one single pixel (each group of touch units includes a plurality of touch units arranged in an array). When the group of touch units corresponding to a first light emitting point receives the touch control instruction, a corresponding touch control signal is sent to the first controller 22 by the group of touch units. The first controller 22 sends a first dimming instruction to the glass assembly 21 based on the received touch control signal and a correspondence relationship between the group of touch units (or the light emitting points) and the dimming instruction, which is pre-stored in the first controller. Then, the glass assembly 21 adjusts its light transmittance based on the first dimming instruction. Similarly, after the groups of touch units corresponding to a second and third light emitting points receives the touch control instructions, the light transmittance of the glass assembly 21 is adjusted based on the above method. The difference between the first, second and third light emitting points is that the dimming instructions corresponding to the positions of the light emitting points at the three positions are different, that is, the light transmittance of the glass assembly at different light emitting points is different after being adjusted. In other words, a plurality of light emitting points corresponds to a plurality of light transmittances, respectively.

In some embodiments, in order to prevent the first display component 24 and the first touch component 25 from affecting the overall glass function of the intelligent glass, preferably, the first touch component 25 is designed as a transparent touch component. In this way, the light emitting device in the corresponding pixel unit and the touch device in the touch component both adopt transparent functional devices.

Figure 3:
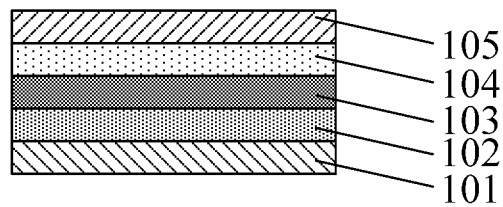
FIG. 3 is a schematic view of a light emitting device according to an embodiment of the present disclosure.

In the present embodiment, the light emitting device in the pixel unit may specifically be an electroluminescent device, that is, a material of the light emitting device is an electroluminescent (EL) material. FIG. 3 is a schematic view of a structure of a light emitting device according to an embodiment of the disclosure. Referring to FIG. 3, the electroluminescent device may include a lower electrode 101, a lower dielectric layer 102, an electroluminescent material layer 103, an upper dielectric layer 104, and an upper electrode 105, which are sequentially provided on a substrate.

It should be noted that, electroluminescence is an optical and electrical phenomenon occurring when a current passes through a material or a strong electric field passes through the material, light is emitted from the material. An electroluminescent display (ELD) is a display technology that uses an electroluminescent material (such as GaAs) sandwiched between two conductors. When a current passes through, the material radiates visible light. When a current passes through the electroluminescent material, the electroluminescent material emits light due to excitation of atoms. With different electroluminescent materials, light of different colors can be emitted. In fact, an electroluminescent device includes flat electrodes which are mutually parallel to each other, and an electroluminescent material. The top layer must be light transmissive, and therefore let light passing therethrough.

The electroluminescent device is driven to emit light as follows: the first controller 22 controls the driving unit to apply an alternating current to the upper electrode 105 and the lower electrode 101 of the electroluminescent device to generate an electric field, and electrons excited by the electric field collide with fluorescent substance in the electroluminescent material layer to cause electron energy level transition, change and recombination to emit cold light with high efficiency, i.e., to realize light emission of the electroluminescent device. As long as an alternating voltage is applied to the upper electrode 105 and the lower electrode 101 of the electroluminescent device in the pixel unit, the light emitting point of the pixel unit can be lit.

In some embodiments of the present disclosure, the first touch component 25 may specifically include a capacitive touch unit. Specifically, the capacitive touch unit may be a mutual-capacitive touch unit or a self-capacitive touch unit. When the touch unit is a mutual-capacitive touch unit, it includes a driving electrode and a sensing electrode. When the touch unit is a self-capacitive touch unit, it includes a touch electrode. No matter the touch unit is a mutual-capacitive touch unit or a self-capacitive touch unit, in order to ensure the light transmittance of the intelligent glass, the touch unit is preferably designed as a transparent touch unit, that is, the electrode structure in the touch unit is made of a transparent conductive material.

In some embodiments, the glass assembly 21 may be a dye dimming glass, and is configured to adjust the light transmittance of the dye dimming glass according to the dimming instruction sent by the first controller 22. The dye dimming glass includes: a first substrate and a second substrate opposite to each other, and a liquid crystal layer between the first substrate and the second substrate. One side of the first substrate proximal to the liquid crystal layer is provided with a first electrode, and one side of the second substrate proximal to the liquid crystal layer is provided with a second electrode. The dye dimming glass is formed by attaching a dyeing material to liquid crystal molecules in the liquid crystal layer. When a voltage is applied to the first electrode and the second electrode to generate an electric field for driving the liquid crystal molecules to deflect, the light transmittance of the dye dimming glass 21 is adjusted.

Specifically, the first controller 22 generates a first dimming instruction according to the touch control instruction, and applies a corresponding voltage to the first electrode and the second electrode of the dye dimming glass according to the first dimming instruction, so as to deflect the liquid crystal molecules in the liquid crystal layer and achieve the corresponding adjustment of the light transmittance.

Of course, in some embodiments, the glass assembly 21 may also adopt an organic electrochromic dimming glass or an inorganic electrochromic dimming glass. The type of dimming glass is not limited in the embodiment of the present disclosure.

In some embodiments, the first display component 24 and the first touch component 25 are formed in the same touch display assembly, and the touch display assembly and the glass assembly 21 may be stacked on each other. Specifically, if the touch display assembly is provided with light emitting points for dimming control of the glass assembly 21, the touch display assembly may be arranged at a corner of the glass assembly 21 to facilitate light adjustment by a user. Of course, the touch display assembly and the glass assembly 21 may also be coupled to each other in a splicing structure. The position relationship between the touch display assembly and the glass assembly is not limited in the embodiment.

Figure 4:
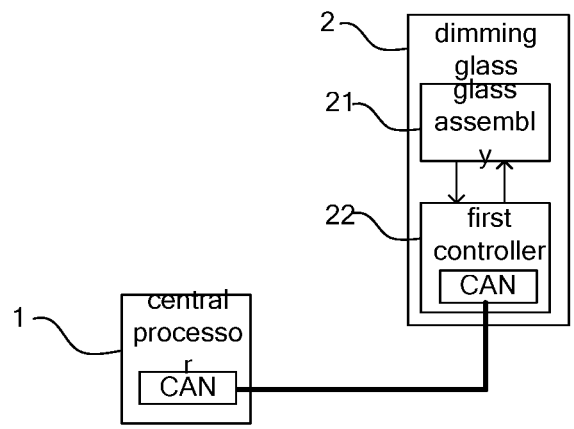
FIG. 4 is a schematic view of connection between a central processor and a dimming glass according to an embodiment of the present disclosure.

FIG. 4 is a schematic view of connection between a central processor and a dimming glass according to an embodiment of the present disclosure. Referring to FIG. 4, in some embodiments, the first controller 22 of the dimming glass is coupled to the central processor 1 through a CAN bus. That is, a CAN module is provided in each of the first controller 22 and the central processor 1.

When the first controller 22 and the central processor 1 are communicating with each other by a CAN bus, a RS485 module may be used as required. Specifically, the communication module in the first controller is a master device of the RS485 module, and the communication module in the central processor 1 is a slave device of the RS485 module. In such a way, the master device constantly monitors whether the slave device sends a dimming instruction, and when receiving the dimming instruction, the light transmittance of the glass assembly 2 is adjusted.

Figure 5:
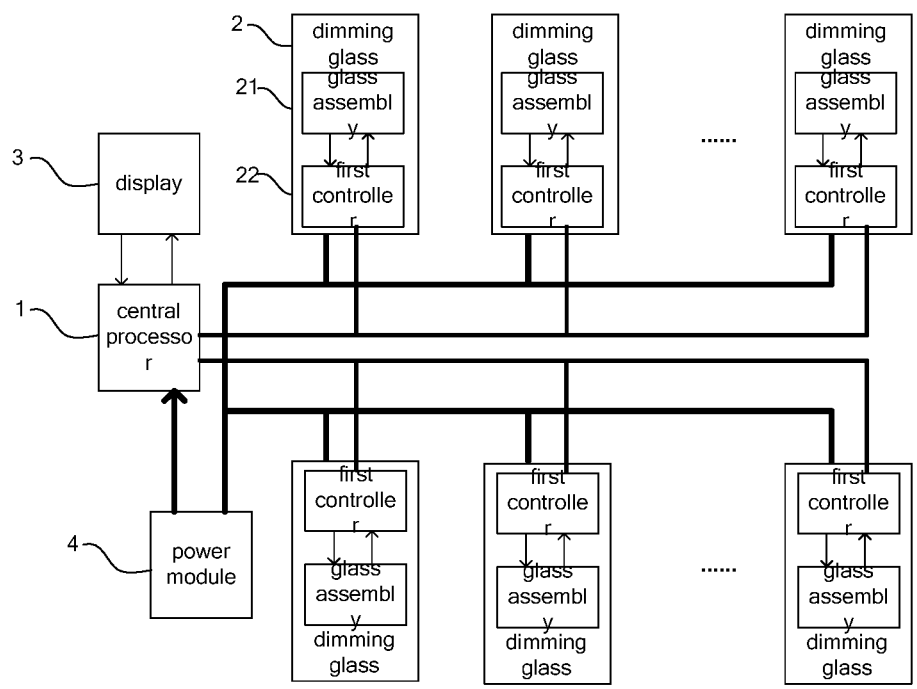
FIG. 5 is a schematic view of another intelligent window system according to an embodiment of the present disclosure.

FIG. 5 is a schematic view of another intelligent window system according to an embodiment of the present disclosure. Referring to FIG. 5, in some embodiments, the intelligent window system not only includes the above structure, but also includes a display 3 coupled to the central processor 1. After the current light transmittance of each dimming glass 2 is fed back by the dimming glass 2 to the central processor 1, the central processor 1 displays the current light transmittance of the dimming glass 2 through the display 3.

Figure 6:
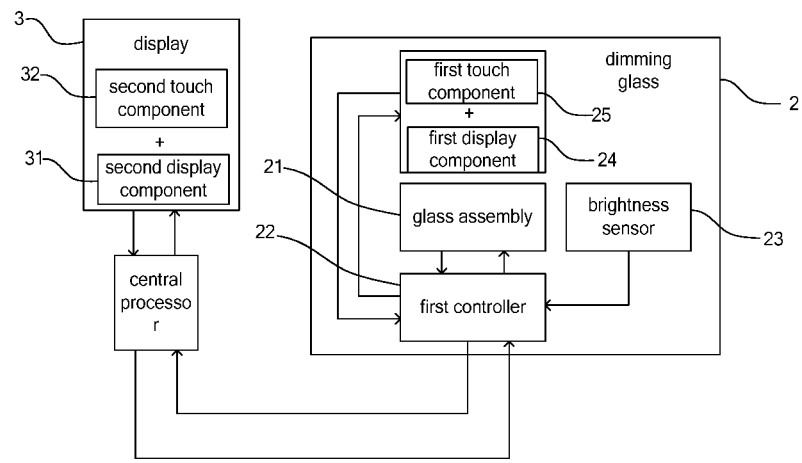
FIG. 6 is a schematic view showing a dimming glass, a central processor and a display according to an embodiment of the present disclosure.

FIG. 6 is a schematic view showing a dimming glass, a central processor and a display according to an embodiment of the present disclosure. Referring to FIG. 6, in some embodiments, the display 3 may be a touch display, that is, a second display component 31 and a second touch component 32 are formed in the display. The second touch component 32 is configured to send a second touch control signal to the central processor 1 according to the received touch control instruction. The central processor 1 generates a corresponding second dimming instruction according to a corresponding relationship between the second touch control signal and the light transmittance pre-stored in the central processor 1, and sends the second dimming instruction to the first controller 22, such that the first controller 22 adjusts the light transmittance of the glass assembly according to the second dimming instruction.

It should be noted that, different second touch components 32 in the touch display correspond to different glass assemblies 21 to be adjusted, respectively. Specifically, after receiving the touch control instruction, each second touch component 32 sends a second touch control signal to the central processor 1, so as to adjust the light transmittance of the glass assembly 21 corresponding to the second touch component 32, that is, the central processor 1 independently controls each glass assembly 21.

The structure of each second touch component 32 may be the same as that of the first touch component, and therefore is not described herein again. The touch display may be a liquid crystal display assembly or an organic electroluminescent light emitting diode display assembly, which is not limited in this embodiment.

In some embodiments, the central processor 1 and the display 3 may be integrated in a same terminal, i.e., the central processor 1 and the display 3 may exist in an in-vehicle form. Of course, the display 3 may exist independently from the central processor 1, for example, the display 3 may be a mobile phone, a tablet computer, and the like.

FIG. 5 is a schematic view of another intelligent window system according to an embodiment of the present disclosure. Referring to FIG. 5, in some embodiments, besides the above structure, the intelligent further includes a power module. The power module is coupled to each of the dimming glasses and the central processor, and supplies power to the dimming glasses and the central processor.

Figure 7:
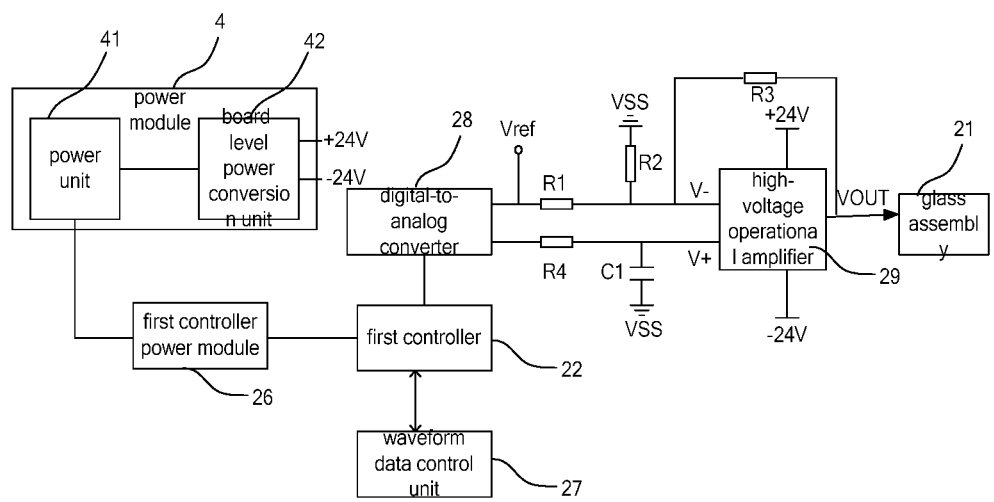
FIG. 7 is a schematic view showing that a power module supplies power to a dimming glass according to an embodiment of the present disclosure.

In an example, FIG. 7 is a schematic view showing that a power module supplies power to a dimming glass according to an embodiment of the present disclosure Referring to FIG. 7, the dimming glass 2 includes not only the above structure, but also a waveform data control unit 27, a digital-to-analog converter 28, a first resistor R1, a second resistor R2, a third resistor R3, a fourth resistor R4, a first capacitor C1, and a high-voltage operational amplifier 29. The waveform data control unit 27 is coupled to the first controller 22; an input terminal of the digital-to-analog converter 28 is coupled to the first controller 22, a first output terminal of the digital-to-analog converter 28 is coupled to a reference voltage terminal Vref and a first terminal of the first resistor R1, a second output terminal of the digital-to-analog converter 28 is coupled to a first terminal of the fourth resistor R4; a second terminal of the first resistor R1 is coupled to a first terminal of the second resistor R2, and a second terminal of the second resistor R2 is coupled to a low power supply voltage terminal VSS; a first terminal of the third resistor R3 is coupled to the second terminal of the first resistor R1, the first terminal of the second resistor R2 and an inverting input terminal of the high-voltage operational amplifier 29, a non-inverting input terminal of the high-voltage operational amplifier 29 is coupled to the second terminal of the fourth resistor R4 and a first terminal of the first capacitor C1, a second terminal of the first capacitor C1 is coupled to the low power supply voltage terminal VSS, and an output terminal of the high-voltage operational amplifier 29 is coupled to the glass assembly; the power supply terminal of the high-voltage operational amplifier 29 is coupled to the power module 42. Of course, a first controller power module 26 for supplying power to the first controller 22 is also provided in the dimming glass 2. In the following description of the specific operation, the power module 4 is exemplified to include a power unit 41 and a board-level power conversion unit 42. The board-level power conversion unit 42 is used for converting a 27V voltage input by the power unit into the voltages of 24V and −24V.

As shown in FIG. 7, the reference voltage terminal Vref, the first resistor R1, the second resistor R2, the third resistor R3, and the output voltage VOUT of the high-voltage operational amplifier 29 constitute an operational amplifier feedback system, and this design needs to output a sinusoidal signal with voltages of ±24V. According to the virtual short concept of the operational amplifier, at the inverting input terminal of the high-voltage operational amplifier 29, the following formula 1 is obtained according to the current relationship:

$$(Vref-V-)/R1+(VOUT-V-)/R3=V-/R2; \quad \text{formula (1).}$$

And then according to the virtual short concept of the operational amplifier, there is $$V-=V+=Vdac; \quad \text{formula (2).}$$

By combining the formula (1) and the formula (2), the relationship among the output voltage VOUT, a direct current output by the digital-to-analog converter 28 and the voltage Vdac at the inverting input terminal of the high-voltage operational amplifier 29 is obtained as follows:

$$VOUT=[(1/R1+1/R2+1/R3)\times Vdac-Vref/R1]\times R3; \quad \text{formula (3).}$$

Here, assuming Vref=2.5V, the voltage Vdac is in a range of 0-2.5V, so as to obtain the output voltages±24V.

When Vdac=2.5V=Vref, the high-voltage operational amplifier 29 is required to satisfy the maximum output voltage, which is expressed as:

$$VOUT=(R3/R2+1)\times Vref; \quad \text{formula (4).}$$

Here, VOUT=23.9V was obtained by substituting 240K for R3, 28K for R2, and 2.5V for Vref in formula (4).

When Vdac=0V, the high-voltage operational amplifier 29 is required to output the minimum output, which is expressed as:

$$VOUT=-(R3/R1)\times Vref; \quad \text{formula (5).}$$

Here, 25K Ω of R1 is substituted into the formula (5) to obtain VOUT=−24V.

In conclusion, the amplitude requirements of the ±24V output of the high-voltage operational amplifier 29 can be realized according to the above parameter setting. In addition, when a waveform output by the digital-to-analog converter 28 represents a frequency signal, as shown in FIG. 7, the fourth resistor R4, the first capacitor C1 and the operational amplifier constitute an active low-pass filter circuit. A frequency of the active low-pass filter circuit is calculated by applying a laplace transform to the non-inverting input terminal V+ of the high-voltage operational amplifier as follows:

$$V+(s)=[1/(1+sR4C1)]\times Vdac(s); \quad \text{formula (6).}$$

An output according to the formulas (1), (2), and (6) can be obtained:

$$VOUT(s)=\{(1/R1+1/R2+1/R3)\times[1/(1+sR4C1)]\times Vdac(s)-Vref/R1\}\times R3; \quad \text{formula (7).}$$

Taking A=(1/R1+1/R2+1/R3)×R3, B=(R3/R1)×Vref,τ=1/R4C1, the formula (7) can be simplified as:

$$VOUT(s)=A\times\{1/[1+(s/\tau)]\}\times Vdac(s)-B; \quad \text{formula (8).}$$

According to the formula (8), an amplitude-frequency characteristics curve of the input signal and the output signal can be obtained, so as to achieve the optimal amplification effect of the output frequency signal. According to the system requirements, f may be taken as 200 Hz. s=j2Πf is substituted into the formula (8), so that the value of the first capacitor C1 can be determined according to the value of the fourth resistor R4.

In FIG. 7, the first controller 22 is used for reading data in the waveform data control unit 27 according to an external control instruction, and then outputting the data to the digital-to-analog converter 28 for conversion. The input from the digital-to-analog converter 28 is subjected to the high-voltage operational amplifier 29 to obtain a required power waveform signal.

The analog-to-digital converter 28 in the module may also generate the signal waveform in a Direct Digital Synthesis (DDS) manner, and since the implementation principle is similar, the detailed description is not repeated here.

In some embodiments, the power module may include a power unit 41, a power isolator 43 and a board-level power conversion unit 42. The power unit 41 is used for providing a standard power supply voltage. The power isolator 43 is used for isolating a voltage higher than the standard power supply voltage. The board-level power conversion unit 42 is used for converting the standard power supply voltage into the voltage required by the dimming glass 2 and the central processor 1.

Figure 8:
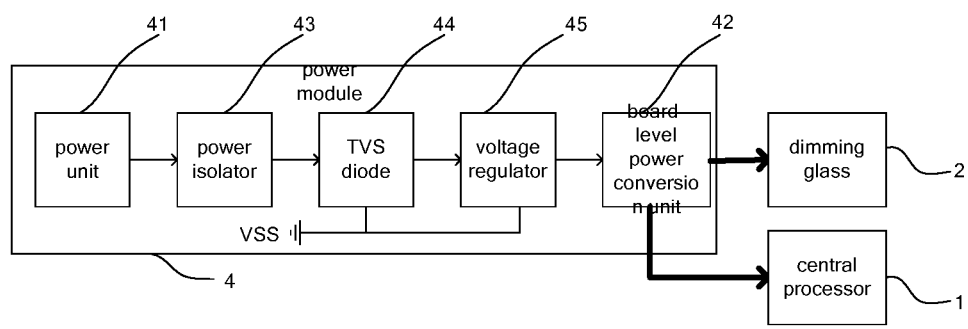
FIG. 8 is a schematic view of a power module according to an embodiment of the present disclosure.

Further, FIG. 8 is a schematic view of a power module according to an embodiment of the present disclosure. Referring to FIG. 8, the power module 4 includes not only the above structure, but also a transient voltage suppressor (TVS diode) 44, and a voltage regulator (Zener diode) 45. The TVS diode 44 is coupled to the power isolator 43, the voltage regulator 45 and the low power supply voltage terminal VSS. The voltage regulator 45 is coupled to the board-level power supply conversion unit 42 and the low power supply voltage terminal VSS. The TVS diode 44 and the voltage regulator 45 are used for regulating the voltage output from the power isolator 43.

It should be noted that, in the embodiment of the present invention, the so-called low power supply voltage terminal may be a ground reference.

Figure 9:
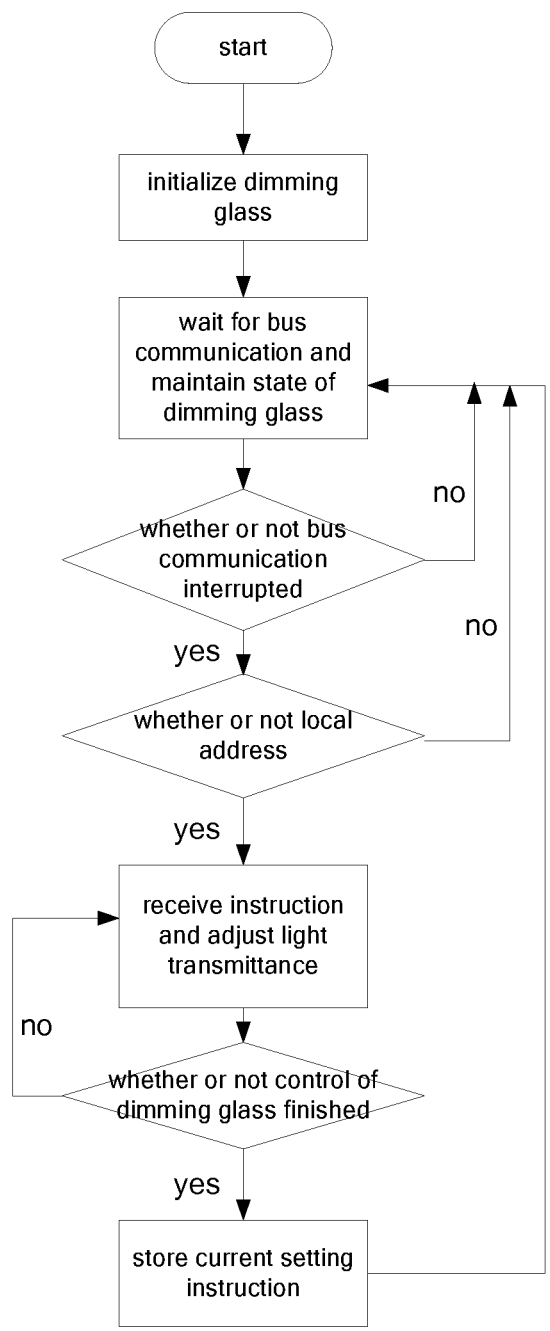
FIG. 9 is a control flow chart of a dimming glass according to an embodiment of the present disclosure.

The following provides a control method for the dimming glass in the embodiment of the present disclosure. FIG. 9 is a control flow chart of a dimming glass according to an embodiment of the present disclosure. Referring to FIG. 9, the method includes: initializing setting of the dimming glass. Specifically, the previous light transmittance of the dimming glass is read during the setting, and a dimming ratio is controlled according to a previous light transmittance of the dimming glass. The first controller of the dimming glass monitors whether there is an address signal corresponding to the dimming glass on the CAN bus. If there is an address signal, the first controller reads the control instruction, and adjusts the light transmittance of the glass assembly according to the control instruction. In this way, one-time control of the dimming glass is completed, and the instruction is stored for next-time reading and control. If there is no address signal, the current light transmittance is used.

Figure 10:
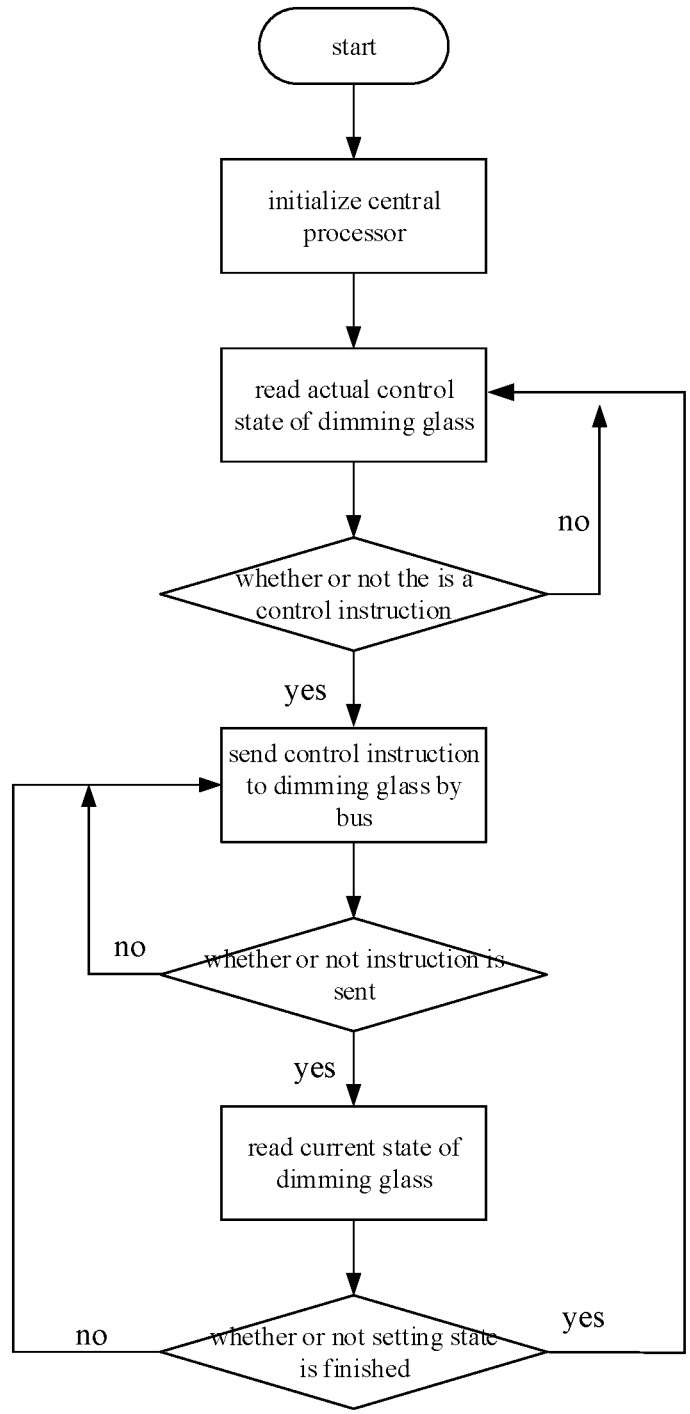
FIG. 10 is a control flow chart of a central processor according to an embodiment of the present disclosure.

The following provides a control method of the central processor in the embodiment of the disclosure. FIG. 10 is a control flow chart of a central processor according to an embodiment of the present disclosure. Referring to FIG. 10, the method includes: reading a control state of each dimming glass after the initializing setting, and reporting a running state of a data analysis system. Whether a control instruction arrives or not is detected under the condition that the data analysis system is in a good state. If the control instruction arrives, the control instruction is sent to the central processor through the CAN bus, and then feedback information from the dimming glass is waited. If the feedback information from the dimming glass is obtained, it shows that the dimming glass is successfully set by the central processor, and then a next process of sending a control instruction is started. In the central processor, the running state of the whole system can be analyzed with a state analysis method, so that a fault module may be quickly located by an operator and the system maintenance is facilitated. The setting method may be directly based on the feedback operation data of the dimming glass, and the central processor may display the light transmittance of the dimming glass in real time through the display, so that use experience is good.

In a second aspect, an embodiment of the present disclosure provides an in-vehicle system, which includes the above intelligent window system.

The intelligent window system can be applied to traffic facilities such as automobiles, trains, airplanes and the like.

It will be understood that, the above embodiments are merely exemplary embodiments adopted to illustrate the principles of the present invention, and the present invention is not limited thereto. It will be apparent to those skilled in the art that various modifications and improvements can be made without departing from the spirit and scope of the invention, and such modifications and improvements are also considered to be within the scope of the invention.

What is claimed is:

1. An intelligent window system, comprising a plurality of dimming glasses and a central processor; wherein
the plurality of dimming glasses are communicatively coupled to the central processor, and configured to adjust light transmittance of each of the plurality of dimming glasses according to a dimming instruction sent by the central processor;
wherein the dimming glass comprises a glass assembly, a first controller and a brightness sensor; the brightness sensor is configured to sense brightness of external ambient light and the first controller is configured to adjust the light transmittance of the glass assembly according to the brightness sensed by the brightness sensor;
wherein the intelligent window system further comprises a display connected to the central processor; and the first controller is further configured to send a current light transmittance of the glass assembly to the central processor, such that the central processor controls the display to display the current light transmittance of the glass assembly; and
wherein the display includes a second touch component configured to send a second touch control signal to the central processor according to a received touch control instruction; and the central processor is configured to send a corresponding dimming instruction to the first controller according to the second touch control signal, such that the first controller adjusts the light transmittance of the glass assembly according to the dimming instruction.

2. The intelligent window system of claim 1, wherein the dimming glass further comprises a first touch component and a first display component;
the first display component comprises a plurality of first pixel units and a first driving unit, and the first driving unit is configured to drive the plurality of first pixel units to display under control of the first controller; and
the first touch component comprises a plurality of first touch units, which are configured to send a first touch control signal to the first controller according to a received touch control instruction, such that the first controller adjusts the light transmittance of the glass assembly according to the first touch control signal.

3. The intelligent window system of claim 2, wherein the first controller is configured to control the first driving unit to drive the plurality of first pixel units to generate a plurality of light emitting points; and the first touch unit is provided corresponding to an area where a light emitting point is located; and
the central processor is configured to send different dimming instructions when receiving touch control signals sent by different touch units provided in areas where different light emitting points are located.

4. The intelligent window system of claim 3, wherein the first controller and the central processor are communicating with each other by a CAN bus; and
the central processor is configured to detect there is a control instruction arriving, and send the control instruction to the CAN bus; the first controller is configured to monitor there is an address signal corresponding to the dimming glass on the CAN bus, and read the control instruction and adjust the light transmittance of the glass assembly according to the control instruction; and the central processor is configured to obtain feedback information from the dimming glass and start a next process of sending a control instruction.

5. The intelligent window system of claim 4, wherein the dimming glass further comprises a waveform data control unit, a digital-to-analog converter, a first resistor, a second resistor, a third resistor, a fourth resistor, a first capacitor and a high-voltage operational amplifier; wherein
the waveform data control unit is coupled to the first controller;
an input terminal of the digital-to-analog converter is coupled to the first controller, a first output terminal of the digital-to-analog converter is coupled to a reference voltage terminal and a first terminal of the first resistor, and a second output terminal of the digital-to-analog converter is coupled to a first terminal of the fourth resistor;
a second terminal of the first resistor is coupled to a first terminal of the second resistor, and a second terminal of the second resistor is coupled to a low power supply voltage terminal;
a first terminal of the third resistor is coupled to the second terminal of the first resistor, the first terminal of the second resistor and a reverse input terminal of the high-voltage operational amplifier; a forward input terminal of the high-voltage operational amplifier is coupled to a second terminal of the fourth resistor and a first terminal of the first capacitor; a second terminal of the first capacitor is coupled to the low power supply voltage terminal; and an output terminal of the high-voltage operational amplifier is coupled to the glass assembly; and
a power supply terminal of the high-voltage operational amplifier is coupled to the power module.

6. The intelligent window system of claim 5, wherein the power module further comprises a transient voltage suppressor and a voltage regulator; and
the transient voltage suppressor is coupled to the power isolator, the voltage regulator and the low power supply voltage terminal, the voltage regulator is coupled to the board-level power conversion unit and the low power supply voltage terminal; and the transient voltage suppressor and the voltage regulator are configured to regulate a voltage output by the power isolator.

7. The intelligent window system of claim 4, wherein the power module comprises:
a power unit, which is configured to supply a standard power supply voltage;
a power isolator, which is configured to isolate a voltage higher than the standard power supply voltage; and a board-level power conversion unit, which is configured to convert the standard power supply voltage into voltages required by the dimming glass and the central processor respectively.

8. The intelligent window system of claim 3, wherein the intelligent window system further comprises a power module coupled to the plurality of dimming glasses and the central processor for supplying power to the plurality of dimming glasses and the central processor.

9. The intelligent window system of claim 1, wherein the display and the central processor are integrated in a same terminal.

10. An in-vehicle system, comprising: the intelligent window system of claim 1.

11. The in-vehicle system of claim 10, wherein the dimming glass further comprises a first touch component and a first display component;

the first display component comprises a plurality of first pixel units and a first driving unit, and the first driving unit is configured to drive the plurality of first pixel units to display under control of the first controller; and the first touch component comprises a plurality of first touch units, which are configured to send a first touch control signal to the first controller according to a received touch control instruction, such that the first controller adjusts the light transmittance of the glass assembly according to the first touch control signal.

12. The in-vehicle system of claim 11, wherein the first controller is configured to control the first driving unit to drive the plurality of first pixel units to generate a plurality of light emitting points; and the first touch unit is provided corresponding to an area where a light emitting point is located; and the central processor is configured to send different dimming instructions when receiving touch control signals sent by different touch units provided in areas where different light emitting points are located.

13. The in-vehicle system of claim 12, wherein the first controller and the central processor are communicating with each other by a CAN bus; and the central processor is configured to detect there is a control instruction arriving, and send the control instruction to the CAN bus; the first controller is configured to monitor there is an address signal corresponding to the dimming glass on the CAN bus, and read the control instruction and adjust the light transmittance of the glass assembly according to the control instruction; and the central processor is configured to obtain feedback information from the dimming glass and start a next process of sending a control instruction.

14. The in-vehicle system of claim 10, wherein the display and the central processor are integrated in a same terminal.

* * * * *